//s United States Patent [19]
Gebelius

[11] 3,983,897
[45] Oct. 5, 1976

[54] PIPE CONNECTION MEANS FOR THE CONNECTION OF CROSSWISELY EXTENDING PIPES TO A LONGITUDINALLY EXTENDING TRANSPORT PIPE

[76] Inventor: Sven Runo Vilheim Gebelius, Eridhemsgatan 27, Stockholm, Sweden, S-11240

[22] Filed: Nov. 21, 1974

[21] Appl. No.: 525,982

[30] Foreign Application Priority Data
Dec. 20, 1973 Sweden .......................... 7317194

[52] U.S. Cl. ............................... 137/318; 137/67; 222/80
[51] Int. Cl.² ........................................ F16K 43/00
[58] Field of Search .......... 137/318, 320, 321, 322, 137/323, 67, 68, 72; 138/89, 92, 94, 97; 222/80

[56] References Cited
UNITED STATES PATENTS

| 2,947,315 | 8/1960 | Connell | 222/80 |
| 3,038,490 | 6/1962 | Yocum | 137/318 |
| 3,115,889 | 12/1963 | Franck et al. | 137/318 |
| 3,162,211 | 12/1964 | Barusch | 137/318 |
| 3,252,474 | 5/1966 | Ehrens et al. | 137/318 |
| 3,428,075 | 2/1969 | Wagner | 137/318 |
| 3,548,848 | 12/1970 | Stichling | 137/68 |
| 3,554,217 | 1/1971 | Ehrens et al. | 137/321 |
| 3,756,261 | 9/1973 | Minchhoff | 137/318 |
| 3,867,964 | 2/1975 | Gardner | 137/318 |

FOREIGN PATENTS OR APPLICATIONS

| 212,769 | 2/1958 | Australia | 137/318 |
| 1,070,691 | 8/1954 | France | 137/318 |
| 2,142,283 | 1/1973 | France | 137/318 |

Primary Examiner—Martin P. Schwadron
Assistant Examiner—George L. Walton
Attorney, Agent, or Firm—Holman & Stern

[57] ABSTRACT

A pipe connection means for connecting at least one transversely extending pipe to a longitudinally extending transport pipe in which a connection unit engaging the transport pipe is provided with a flow channel extending normal and leading to the transport pipe to which the transversely extending pipe is attached, the connection unit also having a guiding channel extending transversely relative to the transport pipe, with the transport pipe having a recess arranged in the guiding channel, and a longitudinally movable and rotatable valve body mounted in the guiding channel and provided with a transverse through flow hole, with the transverse flow hole, in a fixed end position of the valve body, being arranged in line with the recess in the transport pipe and the flow channel and at right angles to the recess and the flow channel to prevent communication between the transport pipe and the transversely extending pipe, but upon rotation of the valve body, the transverse flow hole co-acts with the recess and flow channel to provide an adjustable flow communication between the transport pipe and the transversely extending pipe.

2 Claims, 4 Drawing Figures

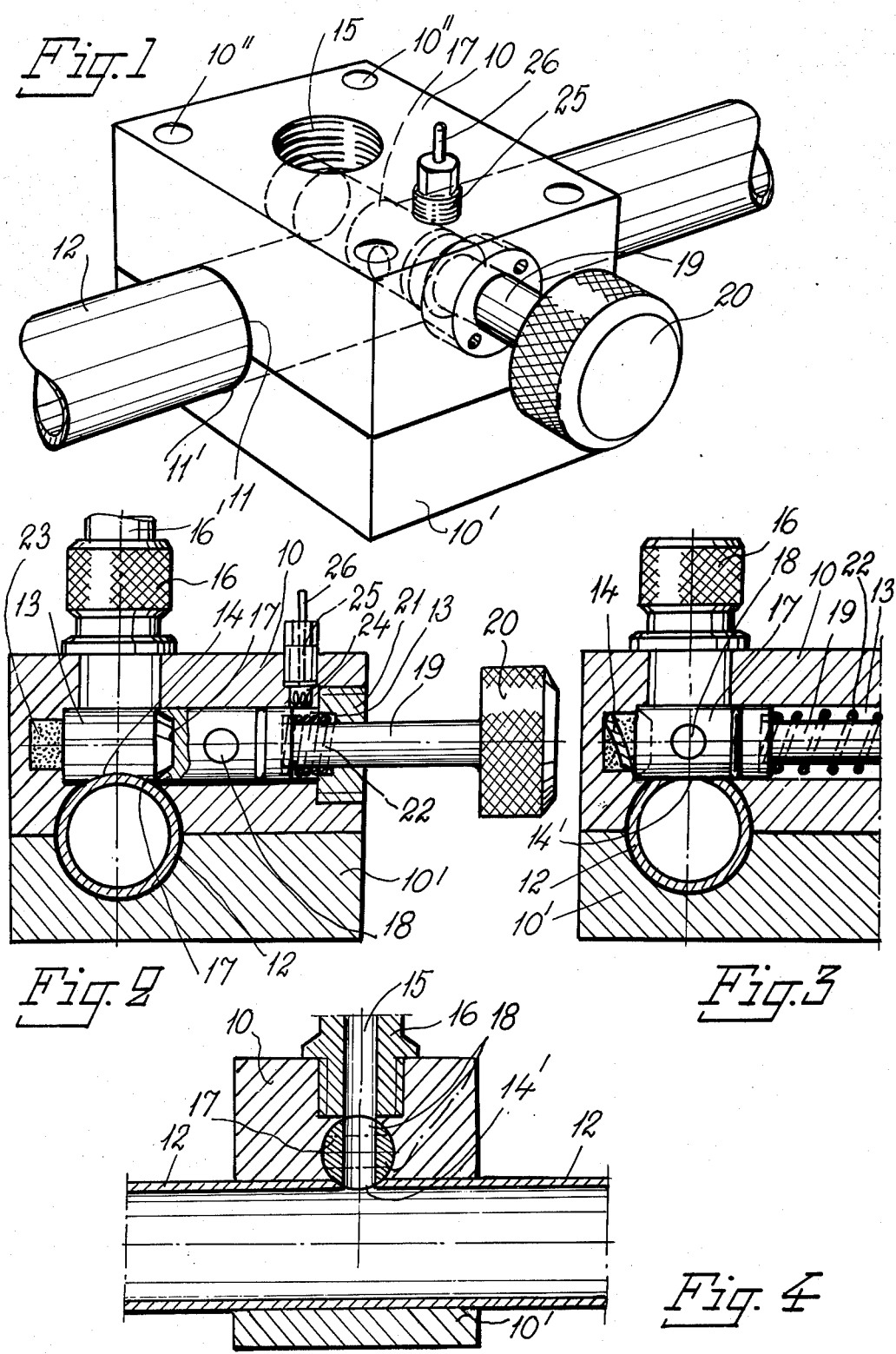

PIPE CONNECTION MEANS FOR THE CONNECTION OF CROSSWISELY EXTENDING PIPES TO A LONGITUDINALLY EXTENDING TRANSPORT PIPE

BACKGROUND OF THE INVENTION

The present invention relates to a pipe connection means for the connection of transversely extending pipes to a longitudinally extending transport pipe for fluid or gas.

PRIOR ART

A number of pipe connection means for the aforementioned purpose are known and used, e.g. in hot water systems for the heating of rooms, wherein transversely extending pipes are connected to a transport pipe in which water heated by means of a heat source is arranged to flow. The transversely extending pipes are connected to convectors for the heating of rooms or premises.

The known pipe connection means do not faciliate the fast and efficient attachment of the transversely extending pipes in desired positions, anywhere along the transport pipe, which often is necessary since the transport pipe normally is previously fixed in a room together with radiators in prearranged positions. It is sometimes necessary, after a certain time, to connect one or several transversely extending pipes to a transport pipe, and the pipe should often be provided with a valve means for adjustment of the flow of fluid in the pipes. Such additions to a pipe system are frequently difficult to accomplish, and particularly if the pipe system is filled with a gas or fluid.

A demand for a simple and efficient pipe connection means, by which transversely extending pipes efficiently and speedily can be connected to the transport pipe, even if said pipe is filled with gas or fluid, has been known for a long time.

SUMMARY OF THE INVENTION

With a pipe connection means according to the present invention, this demand has been completely met, and the pipe connection means is also provided with a valve means for adjustment of the flow of gas or liquid.

The pipe connection means, according to the present invention, comprises two connection parts arranged to engage the transport pipe in a sealing relationship, with the two parts being connectable to each other, thus forming a unit engaging the transport pipe having at least one flow channel leading to the transport pipe, in which the transversely extending pipe is fixed, the pipe connection means mainly being characterized in that at least one guiding channel extends transversely relative to the transport pipe in one of the connection parts, in which a recess in the wall of the transport pipe is arranged, the guiding channel being provided with a longitudinally movable valve member having a through hole for the flow, the valve member being rotatable in the guiding channel, the flow hole of the valve body being arranged in line with the recess in the transport pipe and the flow channel, and arranged to form an adjustable flow communication between the transport pipe and the flow channel.

The pipe connection means is further characterized in that the valve member, when moved under the influence of power, functions to cut a portion of the transport pipe to form the recess, with the cut part being movable with the valve member when the valve member is moved in the guiding channel.

A further characteristic feature according to the present invention is that the valve member is moved in the guiding channel by means of the detonation of an explosive cartridge, directed towards the guiding channel.

An embodiment of the pipe connection means according to the present invention is more fully described below, reference being made to the accompanying drawing.

BRIEF DESCRIPTION OF THE DRAWING

FIG. 1 is a perspective view of the pipe connection means, attached to a transport pipe and in which the broken lines show schematically a valve member included in the pipe connection means, FIG. 2 is, a view partly in section and partly in elevation of the transport pipe and the pipe connection means, before the valve member has been moved to cut off a portion of the wall of the transport pipe, FIG. 3 is a view partly in section and partly in elevation of the transport pipe and a part of the pipe connection means, showing the valve member moved to a final position after cutting a portion of the wall of the transport pipe, with the valve member being arranged to open or close the flow communication between the transport pipe and a transversely extending pipe by means of rotation.

FIG. 4 is a sectional view of the pipe connection means with the valve member arranged in the longitudinal direction of the transport pipe, and the flow communication between the transport pipe and the transversely extending pipe being open.

DETAILED DESCRIPTION OF A PREFERRED EMBODIMENT

Reference numerals 10 and 10' in the figures indicate the two connection parts, with the part 10 having a larger area than the part 10'. The connection parts 10, 10' are in cross-section arranged with a half circular groove 11, 11', with the grooves being adapted to engage a transport pipe 12, when the connection parts 10, 10' are joined together, by means of screws 10''. In order to accomplish a sealing effect between the transport pipe 12 and the connection parts 10, 10', the contacting surfaces can be covered with a sealing paste of previously known type.

The connection part 10, having the larger area, is formed with a round in cross-section guiding channel 13 which extends from one side of the connection part 10 and terminates a short distance from the opposed side of the connection part 10 (FIG. 2). The guiding channel 13 extends transversely in relation to the longitudinal axis of the grooves 11, 11', and is located in a plane above the bottom of the groove 11. The wall of the transport pipe 12 has a portion 14 thereof arranged in the guiding channel 13. Opposed to the portion 14 of the transport pipe 12 and perpendicularly to the guiding channel 13, a flow channel 15 extends from the guiding channel 13 and leads to a free side of the connection part 10. The flow channel 15 is provided with a screw thread, any other suitable means of attachment, or a tubular part 16, in which a transversely extending pipe 16' is attached. The transversely extending pipe 16', which can lead to a convector relay, of course, be directly attached to the flow channel 15, thus making the tubular part 16 unnecessary.

A valve body 17, having a round cross-section, is movably mounted in the guiding channel 13 and provided with a transversely extending flow hole 18. The valve body 17 can be provided with a bar or shaft 19 having a round cross-section, and at the free end is equipped with a 20 by which the valve body can be rotated. A bearing 21, embracing the bar 19, is attached to the connection part 10 at the open portion of the guiding channel 13. Between the bearing 21 and the valve body 17 is positioned a pressure acting helical spring 22 which uncircles the bar 19, in order to keep the valve body 17 in a fixed position in the guiding channel 13.

The portion 14 of the transport pipe 12 extending into the guiding channel 13, is adapted to be cut off by a free edge portion 17' of the valve body 17, when the valve body 17, under the influence of an applied power, is moved in an inward direction from the bearing 21. The valve body 17 can, at the edge portion 17', be formed with an inclined cutting edge. When the valve body 17 is moved to a fixed end position, a recess 14' is formed through the wall of the transport pipe 12. The portion 14 cut off is moved with the valve body 17 to the inside end part of the guiding channel 13, in which a plastic material 23 can be arranged (FIG. 3). In the fixed end position, the transverse flow hole 18 in the valve body 17 is located in a position opposed to the recess 14' and the flow channel 15. When the valve body 17 is rotated by means of the wheel 20 into certain positions, an adjustable flow communication, as shown in FIG. 4, is created, or, as shown in FIG. 3, the flow can be cut off completely. The wheel 20 and the connection part 10 or 10' can be provided with marks indicating various positions of rotation.

The power influence necessary for the movement of the valve body 17 and the removal of the portion 14 in the wall of the transport pipe 12, can be developed by means of an impact power in the longitudinal axis of the valve body 17, i.e. against the outer end portion of the wheel. As a means of impact, a pneumatically or explosively acting device may be used, as well as a hammer, sledge hammer or similar means.

The power acting against the valve body 17, can also be accomplished by means of an explosive cartridge 24, located in the connection part 10 and directed towards the free part of the guiding channel 13, the gas pressure generated by detonation of the cartridge forcing the valve body 17 to cut off the wall portion 14 in the transport pipe 12 under a rapid movement. A seat for the cartridge 24 is arranged in the connection part 10 together with a threaded channel for a screw 25 acting against the cartridge 24, with the screw having an axially extending channel in which a firing pin 26 is axially movable for detonating the cartridge 24. The cartridge 24 is detonated by means of a light stroke against the free end of the firing pin 26, after which the cartridge shell, the screw 25 and the firing pin 26 can be left in the connection part 10.

A valuable and important feature according to the present invention is, that portion 14 of the transport pipe 12 is inserted into the guiding channel 13 and can be speedily removed by the movement of the valve body 17 in the guiding channel 13, thus creating an adjustable flow communication between the transport pipe 12 and the transversely extending pipe 16'.

The recess 14', through the wall of the transport pipe 12, can also be made before the attachment of the connecting parts 10, 10' to the transport pipe 12, e.g. by means of a file or grinding tool. In such a case, the valve body 17 does not need to serve as a hole piercing member and no impact members for the valve body 17 are necessary. However, this means that the transport pipe 12 can not be filled with a fluid or gas when the pipe connection means is attached to the transport pipe 12.

A considerable advantage of the present pipe connection means is that the pipe connection means can not be rotated in relation to the transport pipe 12 when attached, since the pipe connection means is locked to the transport pipe and no rotary movement can occur.

The pipe connection means, according to the present invention, is in no way restricted to the embodiment described and shown on the, since many modifications are possible within the framework of the invention and the following claims.

For instance, a number of valve bodies 17 and flow channels 15 can be arranged within the same pipe connection means. Furthermore, the connection parts 10, 10' can also be provided with channels extending from the flow channel, leading to the sides of the connection parts 10, 10', where connections for transversely extending pipes 16' can be arranged.

I claim:

1. In a pipe connection means for connecting at least one transversely extending pipe to a longitudinally extending transport pipe, the pipe connection means comprising two connection parts attachable to each other including portions for sealingly engaging the transport pipe, thereby forming a connection unit; at least one flow channel in the connection unit leading to one region of the transport pipe wall, the transversely extending pipe being attachable in the one flow channel; at least one guiding channel in one of the connection parts, said guiding channel opening into said flow channel; and a rotatable valve body arranged for displacement within said guiding channel towards said one wall region; the improvement in which said valve body being provided with means defining a forward plane cutting edge for substantially tangential engagement with said transport pipe and piercing at least a portion of said transport pipe at one wall region and forming a recess tangential therein opening into said transport pipe when forwardly further displacing the valve body in said guiding channel, said recess rotatably accommodating the valve body and the valve body prevents movement of the connection unit relative the transport pipe; means arranged for terminating the guiding channel at a region beyond said recess, said means accommodating the wall portion cut out by said cutting edge; and said valve body being provided with means defining a through hole for providing flow communication between said transport pipe and said flow channel when said valve body is rotated about its longitudinal axis to a predetermined position in said recess.

2. A pipe connection means as in claim 1, where the valve body is substantially cylindrical; the plane cutting edge thereof extending circumferentially at the forward end thereof for forming said through recess in said pipe wall by means of a portion of said edge when displacing the same perpendicularly relative the longitudinal axis of said pipe at a distance therefrom less than the internal diameter of the transport pipe; the through hole of said valve body extending along a diameter of said cylindrical body; and means being provided for connecting the other end of the cylindrical body to operating means for displacing and rotating the valve body in said guiding channel and recess, respectively.

* * * * *